Nov. 9, 1926. Re. 16,463

M. F. THOMA

CARDING ENGINE

Original Filed August 18, 1923 2 Sheets-Sheet 1

INVENTOR

Meinrad F. Thoma

By Smithgall Fay & Hartley

ATTORNEYS

Nov. 9, 1926. Re. 16,463

M. F. THOMA

CARDING ENGINE

Original Filed August 18, 1923 2 Sheets-Sheet 2

INVENTOR

Meinrad F. Thoma

By Courtlyde Fay & Harley

ATTORNEYS

Reissued Nov. 9, 1926.

Re. 16,463

UNITED STATES PATENT OFFICE.

MEINRAD F. THOMA, OF GHENT, BELGIUM.

CARDING ENGINE.

Original No. 1,559,475, dated October 27, 1925, Serial No. 658,121, filed August 18, 1923. Application for reissue filed June 18, 1926. Serial No. 116,986.

The present invention relates to carding engines for cotton, etc., and more particularly to the licker-in feeding the lap coming from the scutcher to the main carding cylinder.

The main object of the invention is to construct the licker-in in a manner to reduce the waste and dispersal of good fibres which is known to take place with the devices known up to now.

I attain this object by means of a particular construction of the grid placed underneath the licker-in, by the peculiar shape and arrangement of knives co-operating with the licker-in and which knives are adjustably mounted with reference to the licker-in and to the dish over which the lap is fed on to the licker-in by means of a feed roller.

Other objects of the invention relate to the provision of minor parts co-operating with the elements above noted and to details of constructions, all of which will be more clearly set forth in the following specification.

With the above objects in view the invention resides in the parts and combination of parts hereinafter described and particularly set forth in the claims appended hereto.

In order that my invention may be clearly understood I have illustrated the same in the corresponding drawings, wherein.

Figure 1:
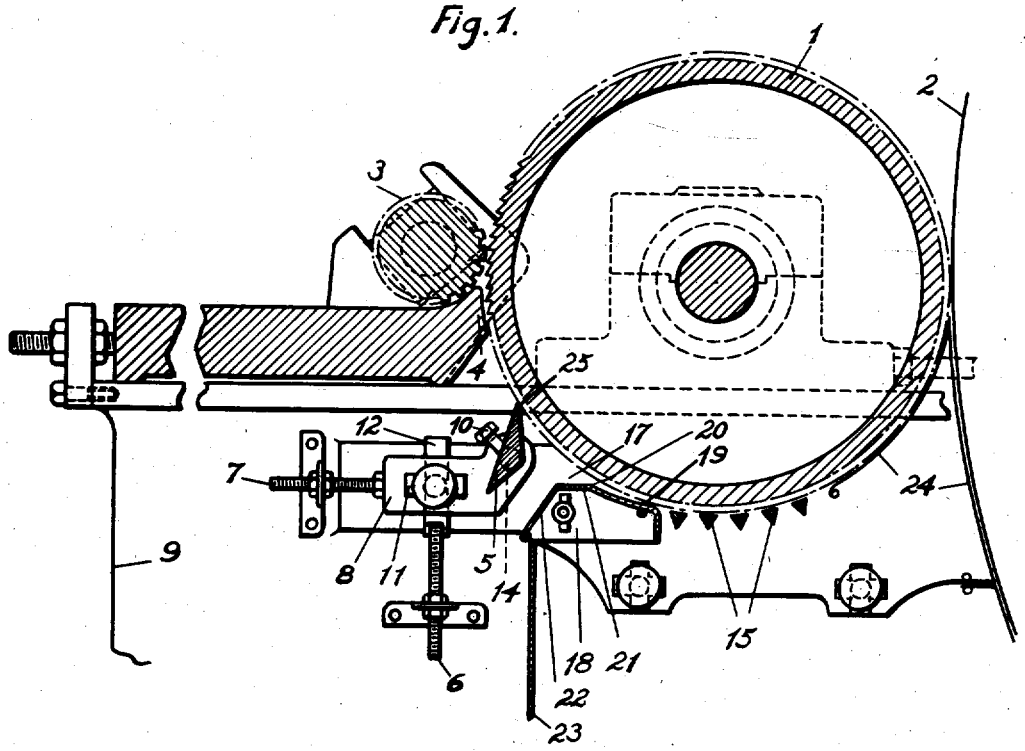
Fig. 1 is a sectional elevation of the licker-in with the grid and part of the main carding cylinder shown in a diagrammatical manner.
Figure 2:
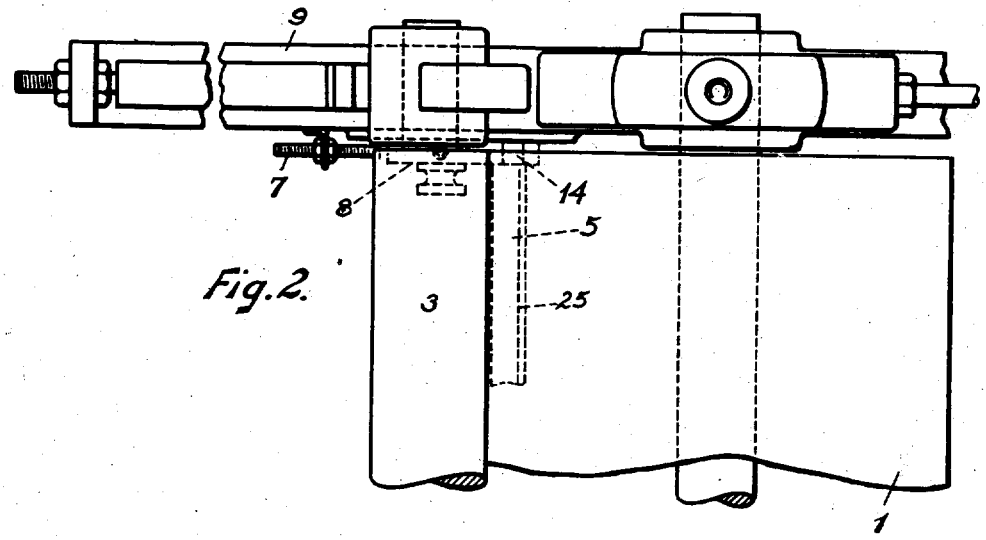
Fig. 2 is a plan of part of the device.
Figure 3:
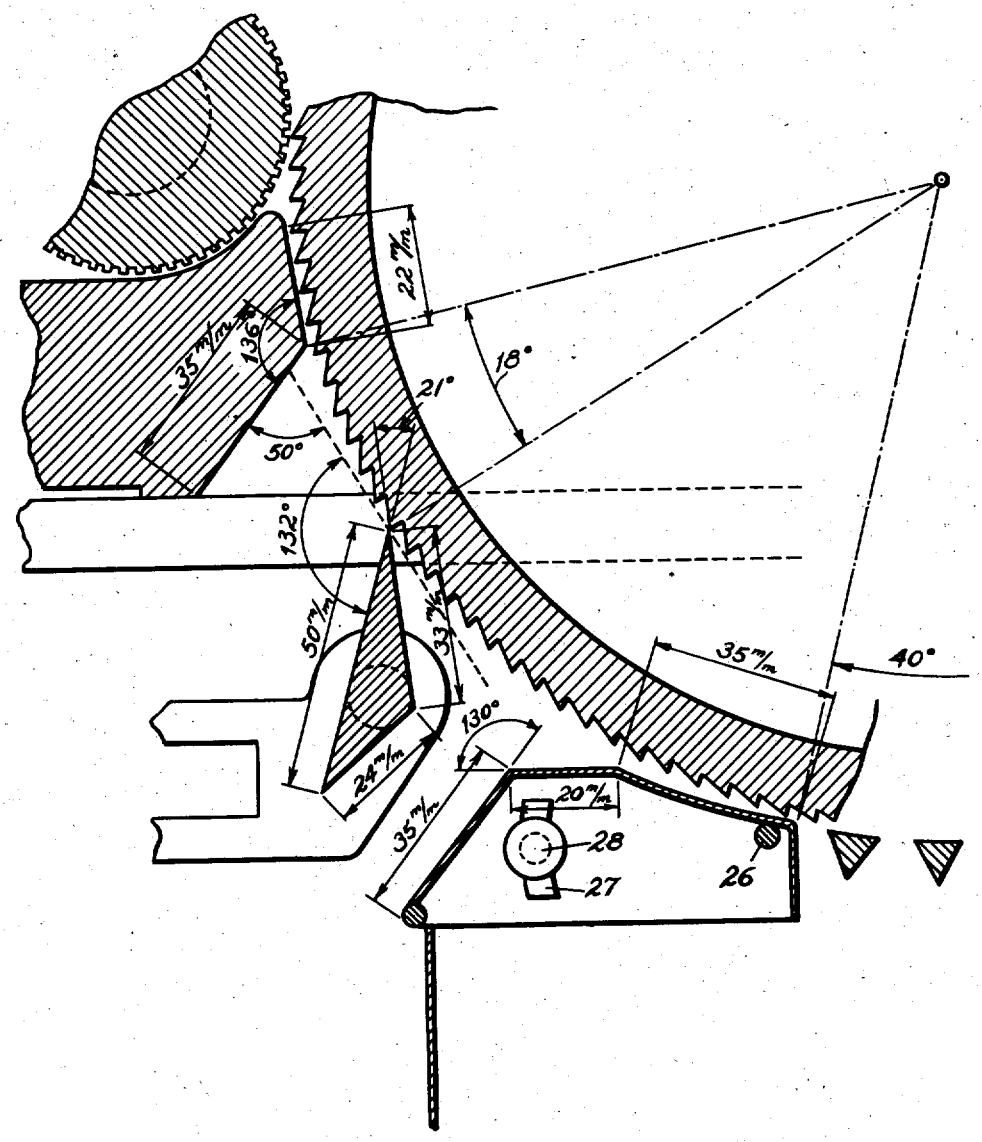
Fig. 3 shows details of construction on a larger scale.

In the drawing 1 denotes the licker-in which may be of any well known construction and which feeds the cotton to the main carding cylinder 2 (only partly shown in Fig. 1). The lap is fed on to the licker-in by means of a feed roller 3 rotatably mounted above the dish 4 the feeding-edge of which carries forward the lap close to the surface of the licker-in. Underneath the licker-in which seizes the cotton as it is delivered from the feed roller 3 there is placed a knife 5 which may be set to any angle with the surface of the licker-in 1 and at any distance thereof by means of adjusting screws 6, 7 acting at right angles on supports 8 slidably arranged on the two shields 9 of the carding engine. The knife 5 intercepts and retains the neps, shale, husks, broken seeds and other impurities which may cling to the cotton fed to the licker-in. The knife 5 is rotatably mounted by means of bolts 14 in the supports 8 and is secured at any suitable angle with reference to the surface at the licker-in 1 by means of set screws 10. The supports 8 are provided with a horizontal slot 11 in which a block 12 projects slidable in vertical direction on a guide of the shield 9. The supports 8 are moved in vertical direction by the set screw 6 and they are adjusted in horizontal direction by gliding on the block 12 by means of the screw 7. Underneath the licker-in 1 a grid 15 having a number of bars running parallel to each other and to the axis of the licker-in 1 is adjustably mounted on a bar 26 and fixed by screw 28 passing through slot 27. At the fore end of the grid an intake 17 is arranged which is formed by a sheet metal plate 18 which adjoins the grid and which runs at 19 slightly eccentrically to the surface of the licker-in, the width of the opening or the distance of the edge 20 from the said surface depending on the length of the fibres to be treated. Part 21 of the sheet metal plate runs horizontally and the part 22 thereof is oblique thereto. Near the fore end of the said intake vertical sheet metal wall 23 is arranged which extends to the bottom of the dust box. At the hind end of the grid 15 the sheet metal walls 24 are arranged which run equidistant to the licker-in and to the main carding cylinder in the well known manner. The distance of the grid surface from the surface of the licker-in is about $\frac{12}{10,000}$ inches, the distance of the edge 25 of the knife 5 from said surface is about $\frac{10}{1000}$ inches and the distance of the dish 4 is about $\frac{7}{1000}$ inches. The dimensions of parts and their position in reference to each other are of great importance to get the best possible result. In Fig. 3 all the dimensions, angles and positions are given which are needed to attain the result aimed at, viz, to remove all the impurities from the cotton without loss of good fibres.

The loss of fibres in the devices of known construction may be attributed to the air set in motion by the rotating licker-in which air whirling around tears fibres from the surface of the licker-in. In the construction described above the air currents are deflected and loose fibres taken partly or wholly off the surface of the licker-in are caught by the intake at the fore end of the grid and only the heavy impurities pass finally into the dust box.

Although I have illustrated and described a preferred form of the invention, I am aware of the fact that modifications can be made therein by any person skilled in the art without departing from the scope of the invention as expressed in the claims. Therefore I do not wish to be limited to the details of construction herein shown and described, but what I do claim is:—

1. In a cotton carding engine, a licker-in and a licker-in grid, the said grid comprising three sections, the first section comprising a broad intake member, presenting a rearwardly and upwardly inclined front face, a substantially horizontal upper front face and an arcuate face in rear of the front face and the chord of which inclines rearwardly toward the periphery of the licker-in, the second section a plurality of narrow grid bars, and the third section a wall of sheet metal which closely surrounds the periphery of the licker-in and a knife bar spaced from said inclined front face of said intake member, said knife bar being triangular in cross section, presenting a relatively broad upwardly and rearwardly inclined front face, a substantially vertical rear face and an inclined lower face, the said rear face converging slightly toward said inclined front face of said intake member, means to adjust said knife bar horizontally and also vertically, and means to secure said knife bar in adjusted position.

2. In a cotton carding engine, a licker-in and licker-in grid, the said grid comprising three sections of which the first section is formed by a broad member inclined to the periphery of the licker-in rotatable about a pivot, said member forming together with the periphery of the licker-in an aperture which is reduced rearward, the surface of the said member directed towards the licker-in being bevelled and presenting a steep front face and a less steep rear face, and an additional arcuate face the chord of which inclines rearwardly toward the periphery of the licker-in, the second section of the grid comprising a plurality of narrow grid bars and the third section a wall of sheet metal closely adjacent to the periphery of the licker-in, and means to lock said first section in adjusted position.

3. In a cotton carding engine, the combination with a licker-in, of a broad member inclined to the periphery of the licker-in, said member forming together with the periphery of the licker-in an aperture which is reduced rearward, the surface of the said member directed towards the licker-in being bevelled and presenting a steep front face and a less steep rear face, and an additional arcuate face the chord of which inclines rearwardly toward the periphery of the licker-in, a plurality of grid bars closely adjacent to the periphery of the licker-in beyond said member.

4. In a cotton carding engine, the combination with a licker-in, of a broad intake member, presenting a rearwardly and upwardly inclined front face, a substantially horizontal upper front face and an arcuate face in rear of the front face and the chord of which inclines rearwardly toward the periphery of the licker-in, a plurality of grid bars, and a knife bar spaced from said inclined front face of said intake member to furnish a space through which air can be drawn by the licker-in between it and the intake member.

5. In a cotton carding engine, the combination with a licker-in, of a broad intake member, presenting a rearwardly and upwardly inclined front face, a substantially horizontal upper front face and an arcuate face in rear of the front face and the chord of which inclines rearwardly toward the periphery of the licker-in.

In testimony whereof I have hereunto affixed my signature.

M. F. THOMA.